United States Patent [19]
Harada

[11] Patent Number: 5,213,088
[45] Date of Patent: May 25, 1993

[54] AIR-FUEL, RATIO CONTROL DEVICE FOR AN INTERNAL COMBUSTION ENGINE

[75] Inventor: Kenichi Harada, Susono, Japan

[73] Assignee: Toyota Jidosha Kabushiki Kaisha, Aichi, Japan

[21] Appl. No.: 913,395

[22] Filed: Jul. 15, 1992

[30] Foreign Application Priority Data

Jul. 17, 1991 [JP] Japan ................... 3-176849

[51] Int. Cl.$^5$ ................... F02D 41/14; F02D 41/22
[52] U.S. Cl. ................... 123/674; 123/690; 123/692
[58] Field of Search ................... 123/674, 690, 692

[56] References Cited

U.S. PATENT DOCUMENTS

| 4,539,958 | 9/1985 | Ito et al. | 123/693 |
| 4,561,400 | 12/1985 | Hattori | 123/478 |
| 4,638,658 | 1/1987 | Otobe | 123/690 |
| 5,070,847 | 12/1991 | Akiyama et al. | 123/690 |
| 5,094,214 | 3/1992 | Kotzan | 123/690 |

FOREIGN PATENT DOCUMENTS 62-32237 2/1987 Japan.

OTHER PUBLICATIONS

Toyota Technical Publication 1389, Oct. 30, 1986.
Toyota Technical Publication 1667, Jan. 29, 1987.

Primary Examiner—Andrew M. Dolinar
Attorney, Agent, or Firm—Oliff & Berridge

[57] ABSTRACT

An air-fuel ratio control device comprising an $O_2$ sensor arranged in an exhaust passage, an air-fuel ratio feedback correction amount calculating unit for calculating an air-fuel ratio feedback correction amount in accordance with an output of the $O_2$ sensor, an average calculating unit for calculating an average of the air-fuel ratio feedback correction amount each time the output of the air-fuel ratio detecting unit is changed from rich to lean or from lean to rich, a learning unit for calculating a learning correction amount on the basis of the average of the air-fuel ratio feedback correction amount so that the average is converged to a predetermined value, an air-fuel ratio control unit for controlling the air-fuel ratio of the engine on the basis of the air-fuel ratio feedback correction amount and the learning correction amount to become the predetermined air-fuel ratio, an abnormal state determining unit for determining that the fuel supply system is in an abnormal state by comparing a determining value calculated on the basis of the average and the learning correction amount with a predetermined reference value, and a prohibiting unit for prohibiting a determination by the abnormal state determining unit during a predetermined time from a time at which the learning correction amount was renewed.

22 Claims, 14 Drawing Sheets

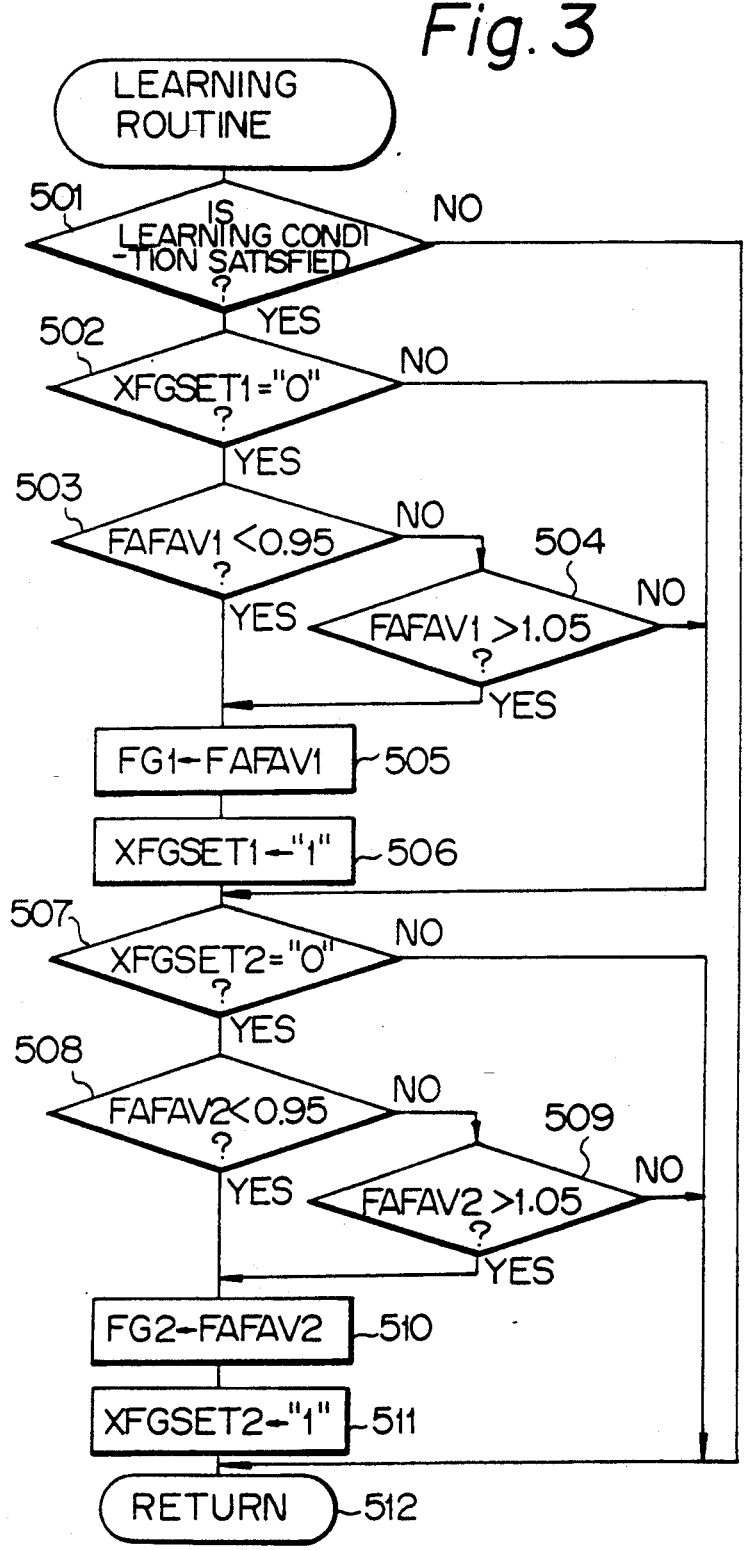

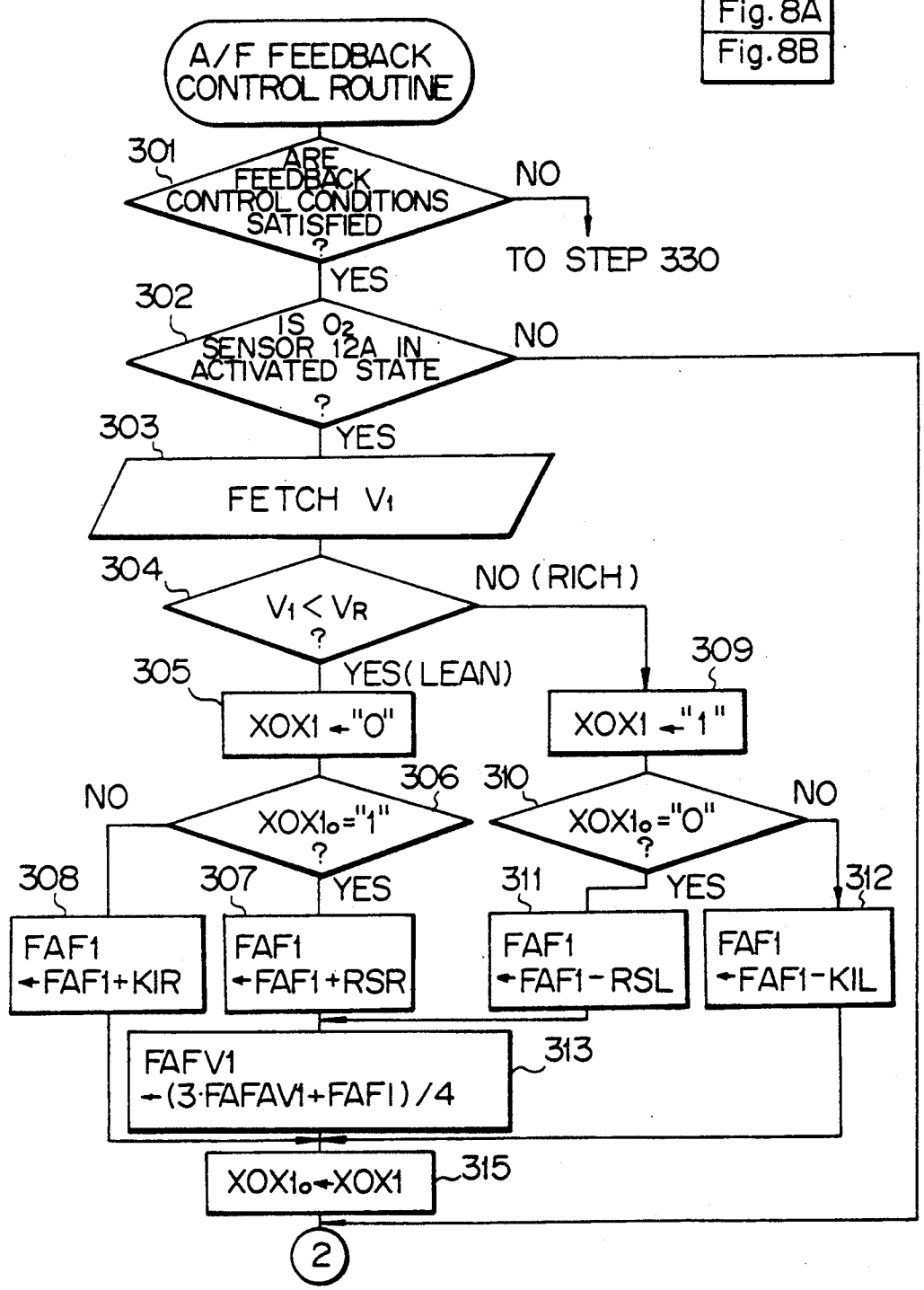

AIR-FUEL, RATIO CONTROL DEVICE FOR AN INTERNAL COMBUSTION ENGINE

BACKGROUND OF THE INVENTION

1. Field of the Invention

The present invention relates to an air-fuel ratio control device for an internal combustion engine.

2. Description of the Related Art

In a general air-fuel ratio feedback control, an air-fuel ratio feedback correction amount FAF is calculated in accordance with an output of an air-fuel detecting sensor (hereinafter referred to as an O₂ sensor (oxygen concentration detection sensor)), and the air-fuel ratio is controlled in accordance with FAF. In this air-fuel ratio feedback control, when the fuel supply system is in an abnormal state, FAF is stuck at a lower guard or an upper guard thereof. For example, when a fuel injection amount is too little due to the abnormal state of the fuel supply system, the output of the O₂ sensor remains lean, and thus FAF is stuck to the upper guard. Conversely, when the fuel injection amount is too large, the output of the O₂ sensor remains rich, and thus FAF is stuck to the lower guard. Accordingly, when FAF is stuck to the upper guard or the lower guard, it can be determined that the fuel supply system is in an abnormal state.

In the air-fuel ratio feedback control into which a learning correction amount is introduced, however, a fluctuation of an average FAFAV of FAF is absorbed by the learning correction amount FG. Accordingly, if it is determined that the fuel supply system is in the abnormal state by detecting that FAF is stuck to the upper or lower guard, the determination of the abnormal state is delayed. Therefore, when a sum of FAF and FG (FAF+FG) or a sum of FAFAV and FG (FAFAV+ FG), or a product of FAF and FG (FAF·FG) or a product of FAFAV and FG (FAFAV·FG) is very different from a predetermined value, it is determined that the fuel supply system is in the abnormal state (see TOYOTA Technical Publication 1389).

Note, in TOYOTA Technical Publication 1389, an engine having first and second cylinder banks is disclosed. In this engine, it is determined whether or not the fuel supply system is in the abnormal state, on the basis of a difference between a sum (or a product) of FAF1 and FG1 of the first cylinder bank and a sum (or a product) of FAF2 and FG2.

Nevertheless, when the learning correction amount FG is renewed, FAF is gradually changed to become an objective value, by an integration amount corresponding to an amount of change of the learning correction amount FG.

For example, referring to FIG. 13, when the learning correction amount FG1 of the first (right) cylinder bank is increased at $t_1$, the air-fuel ratio feedback correction amount FAF1 of the right cylinder bank is gradually decreased by the integration amount, to compensate the increase of FG1, but the average FAFAV1 of air-fuel ratio feedback correction amount FAF1 of the right cylinder bank is not decreased until $t_2$, at which FAF1 is inverted, since the calculation timing of FAFAV1 is when FAF1 is reversed. As a result, between $t_1$ and $t_2$, since (FAFAV1+FG1) becomes too large, |(FAFAV1+FG1)−(FAFAV2+FG2)| becomes an abnormal value. Therefore, a problem arises in that it is misdetermined that the fuel supply system is in the abnormal state.

Note that this problem occurs even if FAFAV1 is calculated at certain time periods, because FG is changed by a relatively large amount when it is renewed, but FAF is changed by a relatively small amount, which is the integration amount, when it is renewed. In other words, because it takes a certain time for FAF to become the value that indicates the necessary correction amount to make the air-fuel ratio close to the target air-fuel ratio with the renewed FG, the problem arises.

SUMMARY OF THE INVENTION

An object of the present invention is to provide an air-fuel ratio control device capable of preventing a misdetermination of an abnormal state of the fuel supply system.

Therefore, according to the present invention, there is provided an air-fuel ratio control device for an internal combustion engine having an exhaust passage and a fuel supply system, the device comprising:

an air-fuel ratio detecting means arranged in the exhaust passage for detecting an air-fuel ratio; an air-fuel ratio feedback correction amount calculating means for calculating an air-fuel ratio feedback correction amount in accordance with an output of the air-fuel ratio detecting means to increase the air-fuel ratio when the output of the air-fuel ratio detecting means is on the rich side and to decrease the air-fuel ratio when the output of the air-fuel ratio detecting means is on the lean side; an average calculating means for calculating an average of the air-fuel ratio feedback correction amount every time the output of the air-fuel ratio detecting means changes from rich to lean or from lean to rich; a learning means for calculating a learning correction amount on the basis of the average of the air-fuel ratio feedback correction amount so that the average converges to form a predetermined value; an air-fuel ratio control means for controlling the air-fuel ratio of the engine on the basis of the air-fuel ratio feedback correction amount and the learning correction amount, to become the predetermined air-fuel ratio; an abnormal state determining means for determining that the fuel supply system is in an abnormal state by comparing a determining value calculated on the basis of the average and the learning correction amount with a predetermined reference value; and a prohibiting means for prohibiting a determination by the abnormal state determining means for a predetermined time from a time at which the learning correction amount was renewed.

The present invention may be more fully understood from the description of the preferred embodiment of the invention set forth below, together with the accompanying drawings.

BRIEF DESCRIPTION OF THE DRAWINGS

In the drawings:

FIGS. 2, 2A and 2B are flow charts of a first embodiment for calculating an air-fuel ratio feedback correction amount FAF;

FIG. 3 is a flow chart of the first embodiment, for calculating a learning correction amount FG;

FIGS. 8, 8A and 8B are flow charts of a second embodiment for calculating an air-fuel ratio feedback correction amount FAF;

DESCRIPTION OF THE PREFERRED EMBODIMENTS

Figure 1:
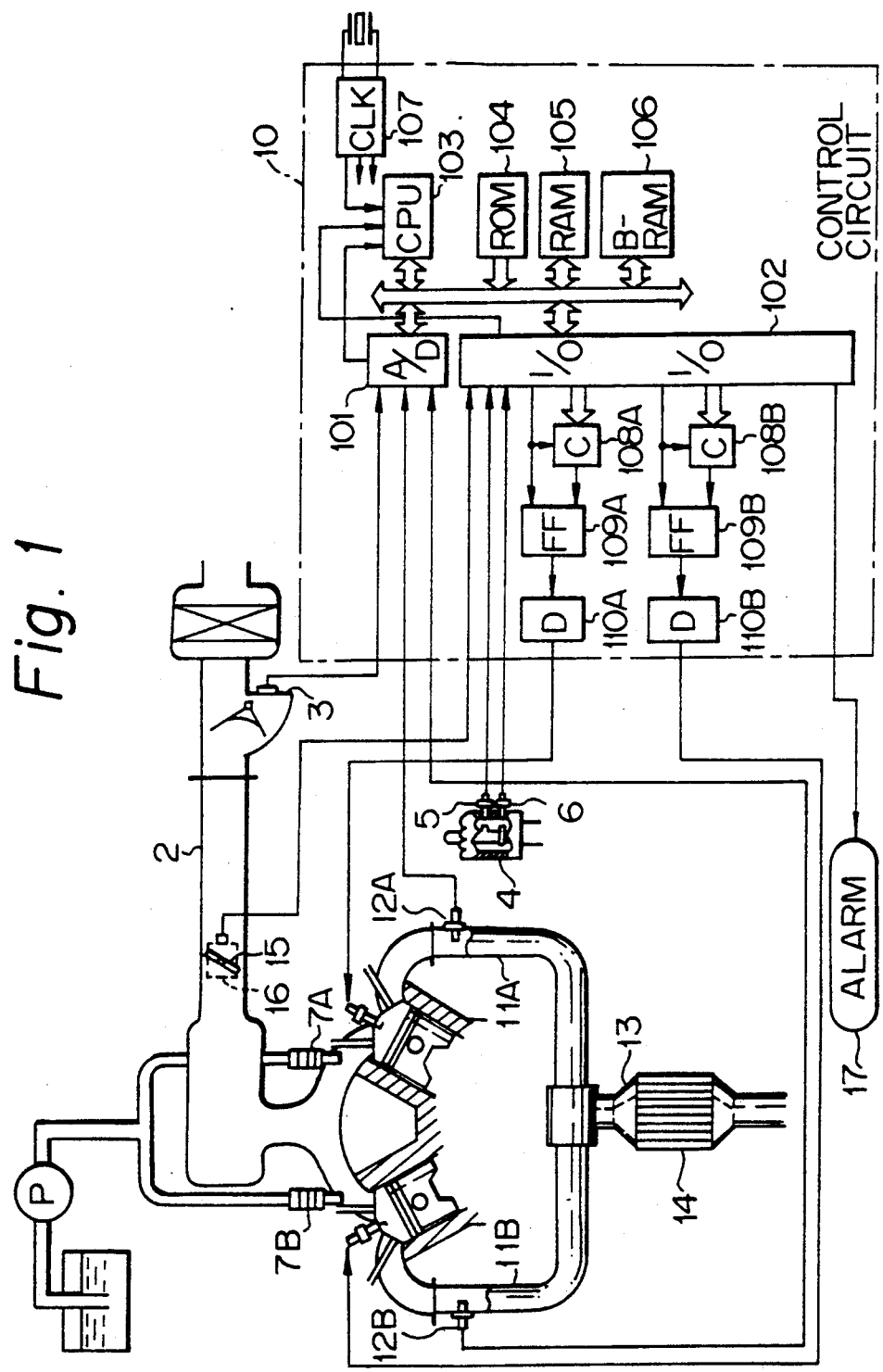
FIG. 1 is a schematic view of an internal combustion engine according to the present invention.

FIG. 1 illustrates a V type gasoline engine according to the present invention. Referring to FIG. 1, a potentiometer-type airflow meter 3 for detecting the amount of air fed into engine cylinders is provided in an intake passage 2 of the engine, and generates an analog voltage signal proportional to the amount of air fed into engine cylinders. The signal from the airflow meter 3 is transmitted to a multiplexer-incorporating analog-to-digital (A/D) converter 101 of a control circuit 10.

Disposed in a distributor 4 are crank angle sensors 5 and 6 for detecting the angle of the crankshaft (not shown) of the engine 1. In this case, the crank angle sensor 5 generates a pulse signal at every 720° crank angle (CA) and the crank angle sensor 6 generates a pulse signal at every 30° CA. The pulse signals of the crank angle sensors 5 and 6 are supplied to an input/output (I/O) interface 102 of the control circuit 10. Further, the pulse signal of the crank angle sensor 6 is supplied to an interruption terminal of a central processing unit (CPU) 103.

Also provided in the intake passage 2 are fuel injectors 7A, 7B for supplying pressurized fuel to each intake port of each cylinder of the engine.

An $O_2$ sensor 12A is provided in an exhaust pipe 11A of a right cylinder bank, and an $O_2$ sensor 12B is provided in an exhaust pipe 11B of a left cylinder bank. The $O_2$ sensors 12A, 12B generate output voltage signals in accordance with a concentration of oxygen in the exhaust gas and transmit those signals to the A/D converter 101 of the control circuit 10. Also, downstreams of two exhaust pipes 11A, 11B are merged at a merging portion 13 and at the merging portion 13, a catalytic converter 14 filled with a three-way catalyst is provided.

The control circuit 10, which may be constructed by a microcomputer, further comprises an A/D converter 101, an I/O interface 102, a control processing unit (CPU) 103, a read-only memory (ROM) 104, a random access memory (RAM) 105, a backup RAM 106, and a clock generator 107. An idle switch 16 for detecting whether or not a throttle valve 15 fully closed is provided at the throttle valve 15 arranged in the intake passage 2, and signals output by the idle switch 16 are transmitted to the I/O interface 102. An alarm 17 by which a driver can find a malfunction of a fuel supply system is connected to the I/O interface 102.

A down counter 108A, a flip-flop 109A, and a driver circuit 110A are used for controlling the fuel injector 7A of the right cylinder bank, and a down counter 108B, a flip-flop 109B, and a drive circuit 110B are used for controlling the fuel injector 7B of the left cylinder bank. Namely, when a fuel injection amount TAUA (TAUB) is calculated in a routine, as explained later, the amount TAUA (TAUB) is preset in the down counter 108A (108B), and simultaneously, the flip-flop 109A (109B) is set, and as a result, the drive circuit 110A (110B) initiates the activation of the fuel injector 7A (7B). Further, the down counter 108A (108B) counts up clock signals, sent from the clock generator 107, and finally, generates a logic "1" signal from the borrow-out terminal of the down counter 108A (108B), to reset the flip-flop 109A (109B), whereby the drive circuit 110A (110B) stops the activation of the fuel injector 7A (7B), and thus an amount of fuel corresponding to the fuel injection amount TAUA (TAUB) is injected from the fuel injector 7A (7B).

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 are fetched by an A/D conversion routine(s) executed at predetermined intervals, and then stored in the RAM 105, i.e., the data Q in the RAM 105 are renewed at predetermined intervals. The engine speed Ne is calculated by an interrupt routine executed at 30° CA, i.e., at every pulse signal of the crank angle sensor 6, and is then stored in the RAM 105.

Figure 2A:
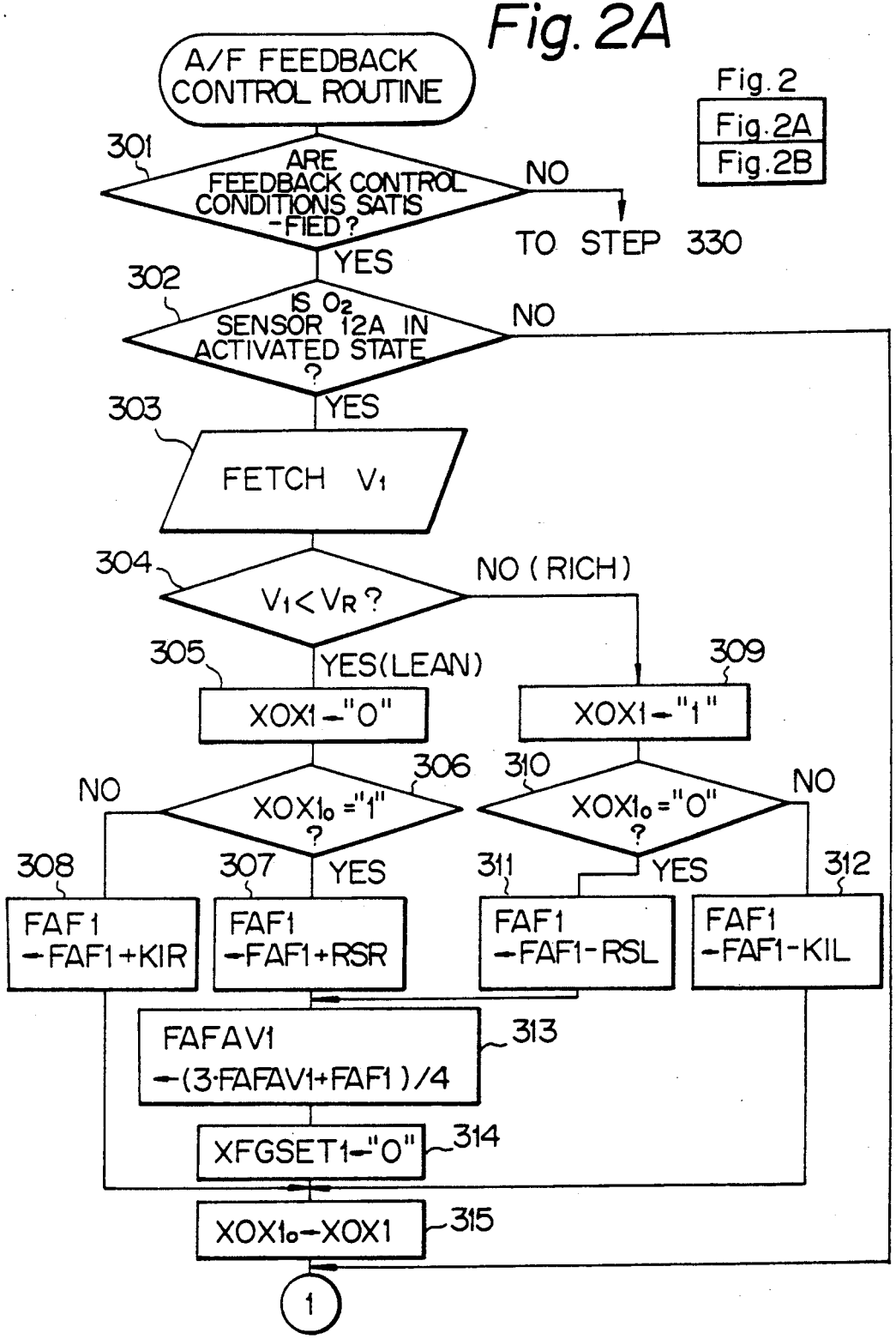
Figure 2B:
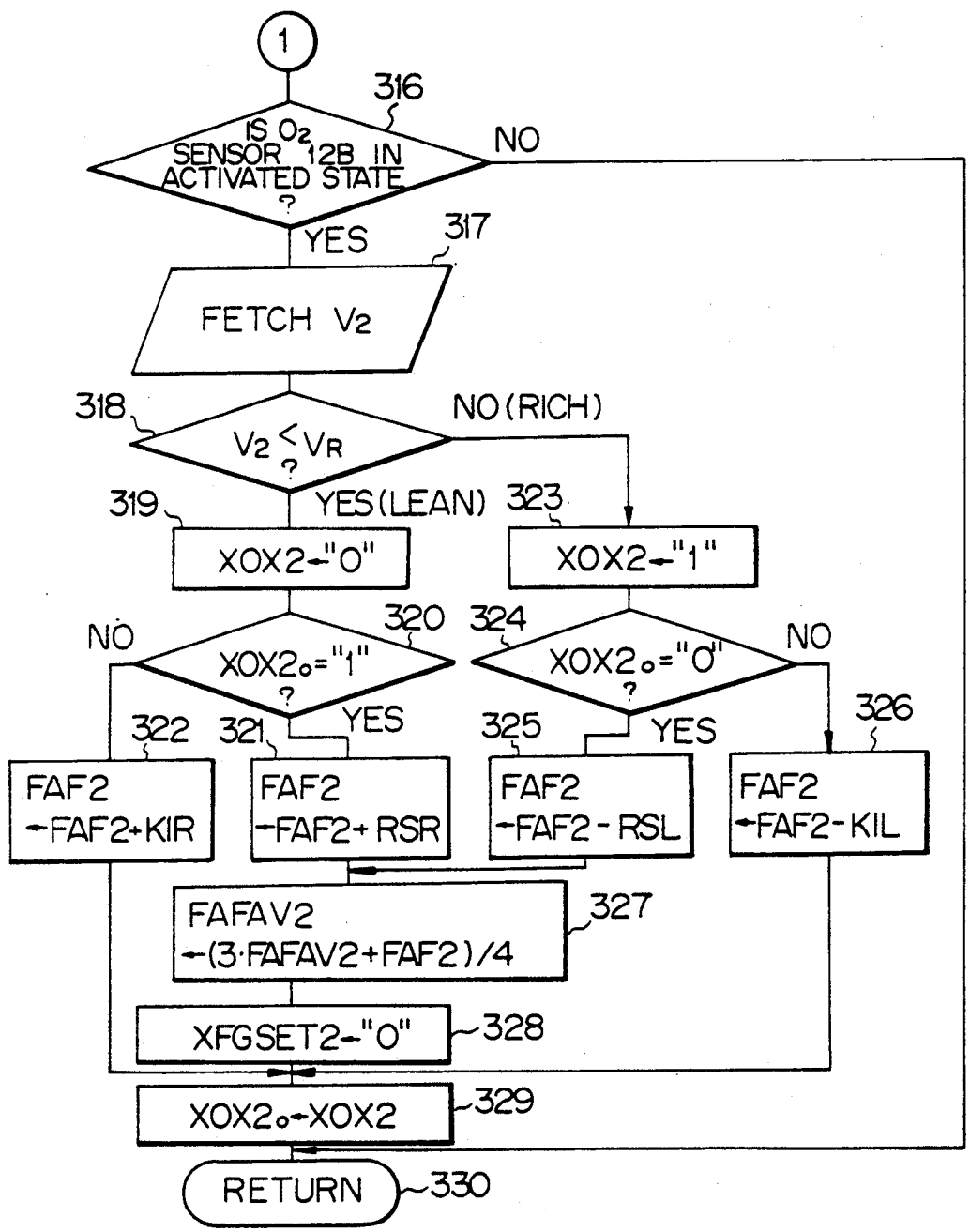

FIGS. 2A and 2B are an air-fuel ratio (A/F) feedback control routine for calculating an air-fuel ratio feedback correction amount FAF1, FAF2 in accordance with the output $V_1$, $V_2$ of $O_2$ sensors 12A, 12B executed at a predetermined time such as 4 ms.

At step 301, it is determined whether or not all of the feedback control (closed-loop control) conditions by $O_2$ sensors 12A, 12B are satisfied. Cases where the feedback control conditions do not stand are, for example, when the cooling water temperature THW is lower than a predetermined temperature, during times of engine starting, times of an increase of fuel after engine starting, times of an increase of fuel during engine warmup, times of an increase of fuel during acceleration (asynchronous fuel injection), times of an increase of fuel during high loads, times of an increase of fuel for preventing a catalyst from overheating, and times of a stop of the fuel supply. When the feedback control conditions are not satisfied, the routine goes to step 330.

From step 302 to step 315, the air-fuel ratio feedback correction amount FAF1 for the right cylinder bank is calculated. At step 302, it is determined whether or not the $O_2$ sensor 12A is in an activated state. When the $O_2$ sensor 12A is not in the activated state, the routine goes to step 316. Conversely, when the $O_2$ sensor 12A is in the activated state, the routine goes to step 303. At step 303, an A/D conversion is performed upon the output voltage $V_1$ of the $O_2$ sensor 12A, and the A/D converted value thereof is then fetched from the A/D converter 101.

At step 304, it is determined whether or not $V_1$ is smaller than a reference voltage $V_R$, such as 0.45 V, to thereby determine whether the current air-fuel ratio detected by the $O_2$ sensor 12A is on the rich side or the lean side with respect to the stoichiometric air-fuel ratio. When $V_1 \leq V_R$, i.e., the current air-fuel ratio is lean, the routine goes to step 305 and an air-fuel ratio flag XOX1 is reset to 0 (lean). At step 306, it is determined whether or not a previous air-fuel ratio flag $XOX1_0$ is equal to 1 (rich), i.e., the air-fuel ratio is inverted from rich to lean. When the air-fuel ratio is inverted, the routine goes to step 307, and a rich skip amount RSR is added to FAF1 for a skip-increase of the value. Conversely, when the air-fuel ratio is not inverted, the routine goes to step 308, and a rich integration constant KIR is added to FAF1 to thereby gradually increase FAF1.

At step 304, when $V_1 > V_R$, i.e., the current air-fuel ratio is rich, the routine goes to step 309 and the air-fuel ratio flag XOX1 is set to 1 (rich). Then, at step 310, it is determined whether or not the previous air-fuel ratio flag $XOX1_0$ is equal to 0 (lean), i.e., the air-fuel ratio is inverted from rich to lean. When the air-fuel ratio is inverted, the routine goes to step 311, and a lean skip amount RSL is subtracted from FAF1 to thus skip-reduce the value. Conversely, when the air-fuel ratio is not inverted, the routine goes to step 312, and a lean integration constant KIL is subtracted from FAF1 to thereby gradually reduce FAF1.

Each time the air-fuel ratio is inverted, step 313 and step 314 are carried out. Namely, at step 313, an average FAFAV1 of the air-fuel ratio feedback correction amount FAF1 is calculated from the following expression.

$$FAFAV1 \leftarrow (3 \cdot FAFAV1 + FAF1)/4$$

FAFAV1 may be calculated by another method, for example, FAFAV1 may be an arithmetic mean of FAF1. Then, at step 314, a learning flag XFGSET1 is reset to 0 to indicate that the average FAFAV1 has been renewed. Note, the learning XFGSET1 is set to 1 when a learning correction amount FG1 is changed in another routine as described later. At step 315, XOX1 is then stored in $XOX1_0$.

From step 316 to step 329, the air-fuel ratio feedback correction amount FAF2 for the left cylinder bank is calculated. Namely, at step 316, it is determined whether or not the $O_2$ sensor 12B is in an activated state. When the $O_2$ sensor 12B is not in the activated state, the routine goes to step 330. Conversely, when the $O_2$ sensor 12B is in the activated state, the routine goes to step 317. At step 317, an A/D conversion is performed upon the output voltage $V_2$ of the $O_2$ sensor 12B, and the A/D converted value thereof is then fetched from the A/D converter 101.

At step 318, it is determined whether or not $V_2$ is smaller than a reference voltage $V_R$ such as 0.45 V, to thereby determine whether the current air-fuel ratio detected by the $O_2$ sensor 12B is on the rich side or the lean side with respect to the stoichiometric air-fuel ratio. When $V_2 \leq V_R$, i.e., the current air-fuel ratio is lean, the routine goes to step 319 and an air-fuel ratio flag XOX2 is reset to 0 (lean). At step 320, it is determined whether or not a previous air-fuel ratio flag $XOX2_0$ is equal to 1 (rich), i.e., the air-fuel ratio is inverted from rich to lean. When the air-fuel ratio inverts, the routine goes to step 321, and a rich skip amount RSR is added to FAF2 to thus skip-increase the value. Conversely, when the air-fuel ratio is not inverted, the routine goes to step 322, and a rich integration constant KIR is added to FAF2 to thereby gradually increase FAF2.

At step 318, when $V_2 > V_R$, i.e., the current air-fuel ratio is rich, the routine goes to step 323 and the air-fuel ratio flag XOX2 is set to 1 (rich). Then, at step 324, it is determined whether or not the previous air-fuel ratio flag $XOX2_0$ is equal to 0 (lean), i.e., the air-fuel ratio is inverted from rich to lean. When the air-fuel ratio is inverted, the routine goes to step 325, and a lean skip amount RSL is subtracted from FAF2 to thus skip-reduce the value. Conversely, when the air-fuel ratio is not inverted, the routine goes to step 326, and a lean integration constant KIL is subtracted from FAF2 to thereby gradually reduce FAF2.

Each time the air-fuel ratio is inverted, step 327 and step 328 are carried out. Namely, at step 327, an average FAFAV2 of the air-fuel ratio feedback correction amount FAF2 is calculated from the following expression.

$$FAFAV2 \leftarrow (3 \cdot FAFAV2 + FAF2)/4$$

FAFV2 may be calculated by another method, for example, FAFAV2 may be an arithmetic mean of FAF2. Then at step 328, a learning flag XFGSET2 is reset to 0 to indicate that the average FAFAV2 has been renewed. Note, the learning flag XFGSET2 is set to 1 when a learning correction amount FG2 is changed in another routine, as described later. Then, at step 329, XOX2 is stored in $XOX2_0$, and at step 330, this routine is completed.

Note, the integration constants KIR, KIL are much smaller than the skip amounts RSR, RSL.

Also, when the feedback control conditions are not satisfied, FAF1 and FAF2 may be made 1.0.

FIG. 3 is a learning routine for calculating the learning correction amounts FG1, FG2 executed at a predetermined time, such as 1024 ms. At step 501, it is determined whether or not a learning condition is satisfied. For example, it is determined whether or not the amount Q of air fed into the engine cylinders is smaller than a constant value. When Q is equal to or larger than the constant value, the routine is ended, and thus the learning control is not carried out. Conversely, when the learning condition is satisfied, the routine goes to step 502.

From step 502 to step 506, the learning correction amount FG1 for the right cylinder bank is calculated. At step 502, it is determined whether or not the learning flag XFGSET1 is reset, i.e., the average FAFAV1 has been renewed. When XFGSET1 is not reset, i.e., FAFAV1 has not been renewed, the routine jumps to step 507, and thus the learning correction amount FG1 is not renewed. This is because FG1 need not be renewed if FAFAV1 has not been renewed. When XFGSET1 is reset, the routine goes to step 503 and it is determined whether or not FAFAV1 is smaller than 0.95. When FAFAV1<0.95, the routine goes to step 505 and FAFAV1 is stored in FG1. Then, at step 506, XFGSET1 is set to 1. Conversely, when FAFAV1≧0.95, the routine goes to step 504 and it is determined whether or not FAFAV1 is larger than 1.05. When FAFAV1>1.05, the routine goes to step 505 and step 506. Namely, only when FAFAV1<0.95 or FAFAV1>1.05, is the learning correction amount FG1 renewed and the learning flag XFGSET1 set. When FAFAV1≧0.95 and FAFAV1≦1.05, the routine goes to step 507, and thus FG1 is not renewed.

From step 507 to step 511, the learning correction amount FG2 for the left cylinder bank is calculated. At step 507, it is determined whether or not the learning flag XFGSET2 is reset, i.e., the average FAFAV2 has been renewed. When XFGSET2 is not reset, i.e., FAFAV2 has not been renewed, the routing jumps to step 512 and thus the learning correction amount FG2 is not renewed. This is because FG2 need not be renewed if FAFAV2 has not been renewed. When XFGSET2 is reset, the routine goes to step 508 and it is determined whether or not FAFAV2 is smaller than 0.95. When FAFAV2<0.95, the routine goes to step 510 and FAFAV2 is stored in FG2. Then, at step 511, XFGSET2 is set to 1. Conversely, when FAFAV2≧0.95, the routine goes to step 509 and it is determined whether or not FAFAV2 is larger than 1.05. When FAFAV2>1.05, the routine goes to step 510 and step 511. Namely, only when FAFAV2<0.95 or FAFAV2>1.05, is the learning correction amount FG2 renewed and the learning flag XFGSET2 set. When FAFAV2≧0.95 and FAFAV2≦1.05, the routine goes to step 512, and thus FG2 is not renewed. At step 512, this routine is ended.

Figure 4:
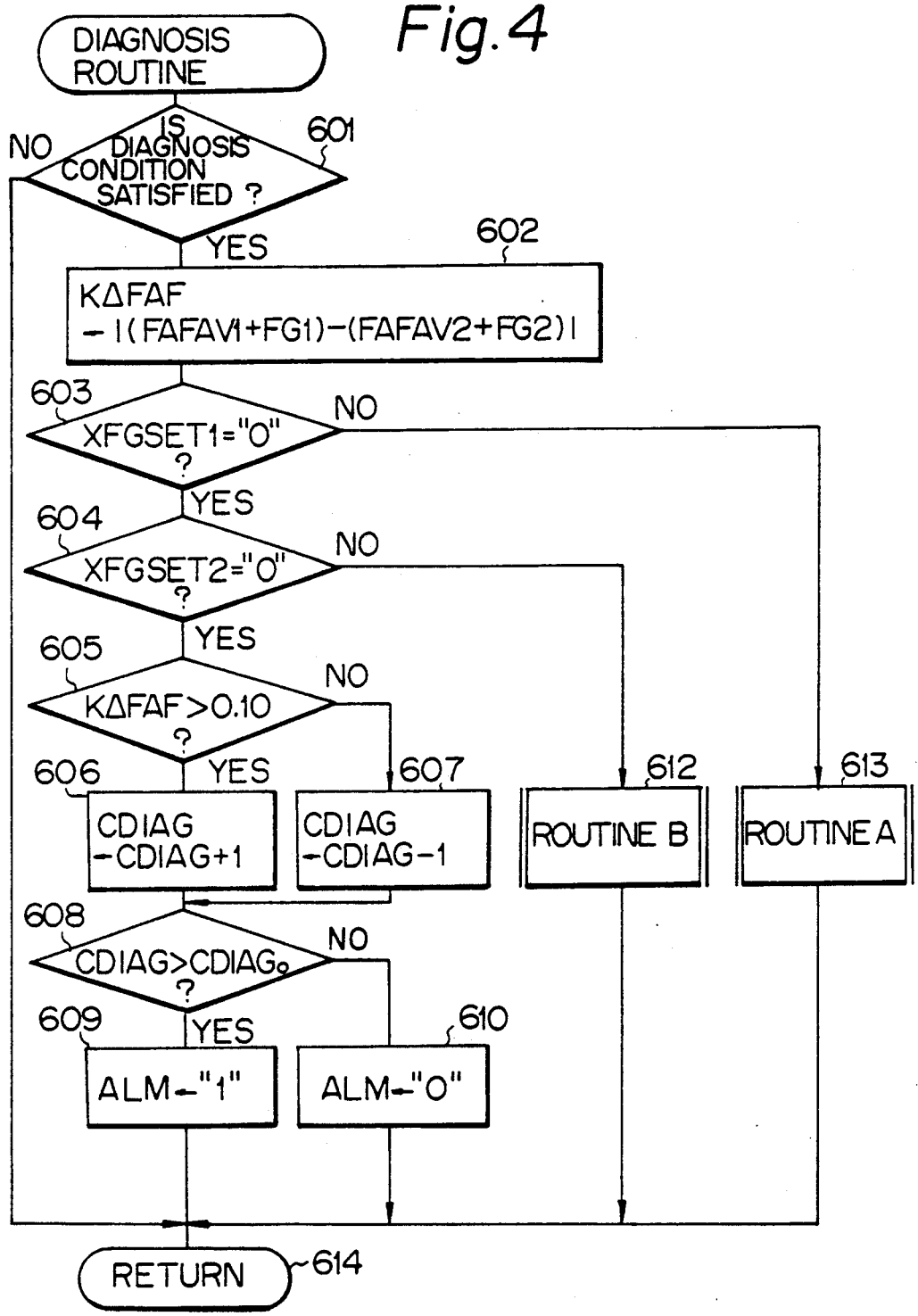
FIG. 4 is a flow chart of the first embodiment for detecting a malfunction of the fuel supply system.

FIG. 4 is a diagnosis routine for detecting a malfunction of the fuel supply system, and is executed at a predetermined time such as 256 ms. At step 601, it is determined whether or not a diagnosis condition is satisfied. The diagnosis condition is satisfied, for example, when the learning condition (step 501 in FIG. 3) is satisfied, when the car is not driven at a high altitude, and further, when the engine is running while the car is stationary. When the diagnosis condition is not satisfied, the routine jumps to step 614 and is ended.

Conversely, when the diagnosis condition is satisfied, the routine goes to step 602 and a difference KΔFAF between a sum of FAFAV1 and FG1 of the right cylinder bank and a sum of FAFAV2 and FG2 of the left cylinder bank is obtained from the following equation.

$$K\Delta FAF = |(FAFAV1+FG1)-(FAFAV2+FG2)|$$

At step 603, it is determined whether or not the learning flag XFGSET1 is reset, i.e., the average FAFAV1 has been renewed after the learning correction amount FG1 was renewed. When XFGSET1 is not reset, the routine goes to step 613 and then this routine is ended. Step 613 is described later. When XFGSET1 is reset, the routine goes to step 604 and it is determined whether or not the learning flag XFGSET2 is reset, i.e., the average FAFAV2 has been renewed after the learning correction amount FG2 was renewed. When XFGSET2 is not reset, the routine goes to step 612 and then this routine is ended. Step 612 is described later. When XFGSET1 is reset and XFGSET2 is reset, i.e., FAFAV1 has been renewed after FG1 was renewed and FAFAV2 has been renewed after FG2 was renewed, the routine goes to steps 605 through 610 and the diagnosis is carried out.

Namely, at step 605, it is determined that KΔFAF is larger than a predetermined value such as 0.10, i.e., the fuel supply system is in an abnormal state. When KΔFAF>0.10, i.e., the fuel supply system is in an abnormal state, the routine goes to step 606 and a diagnosis counter CDIAG is incremented by 1. Conversely, when KΔFAF≦0.10, i.e., the fuel supply system is not in the abnormal state, the routine goes to step 607 and the diagnosis counter CDIAG is decremented by 1. At step 608, it is determined whether or not the diagnosis counter CDIAG is larger than a predetermined value CDIAG$_0$, i.e., a malfunction of the fuel supply system has occurred. When CDIAG>CDIAG$_0$, i.e., it is determined that a malfunction of the fuel supply system has occurred, the routine goes to step 609 and an alarm flag ALM is set to 1, to activate the alarm 17. Conversely, when CDIAG≦CDIAG$_0$, i.e., it is determined that the malfunction of the fuel supply system has not occurred, the routine goes to step 610 and the alarm flag ALM is reset, and thus the alarm 17 is not activated. Then at step 614, this routine is ended.

Figure 5:
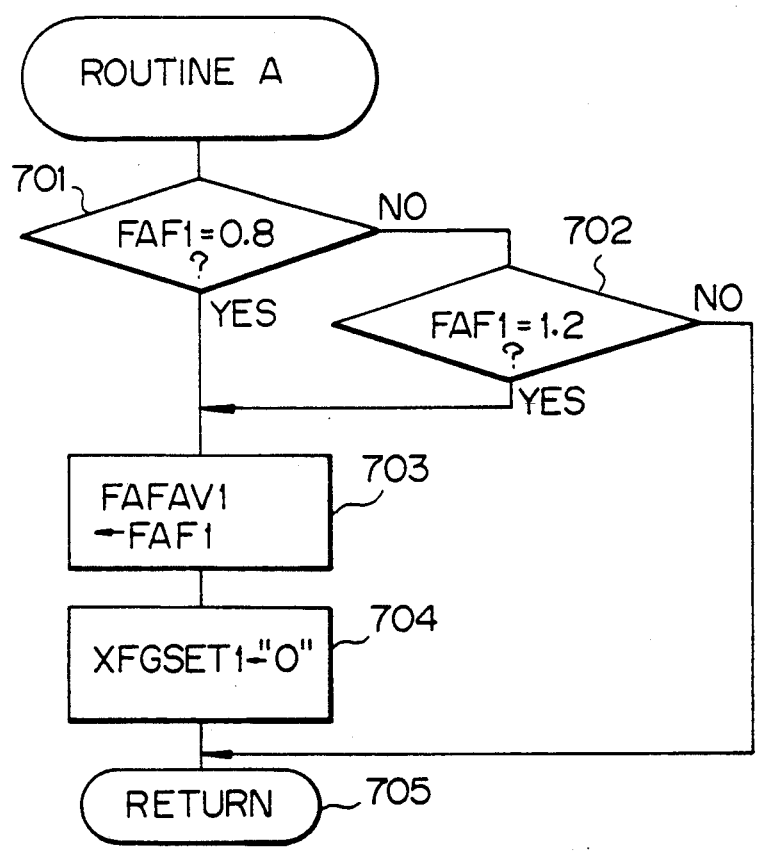
FIG. 5 is a detailed flow chart of routine A at step 613 in FIG. 4.
Figure 6:
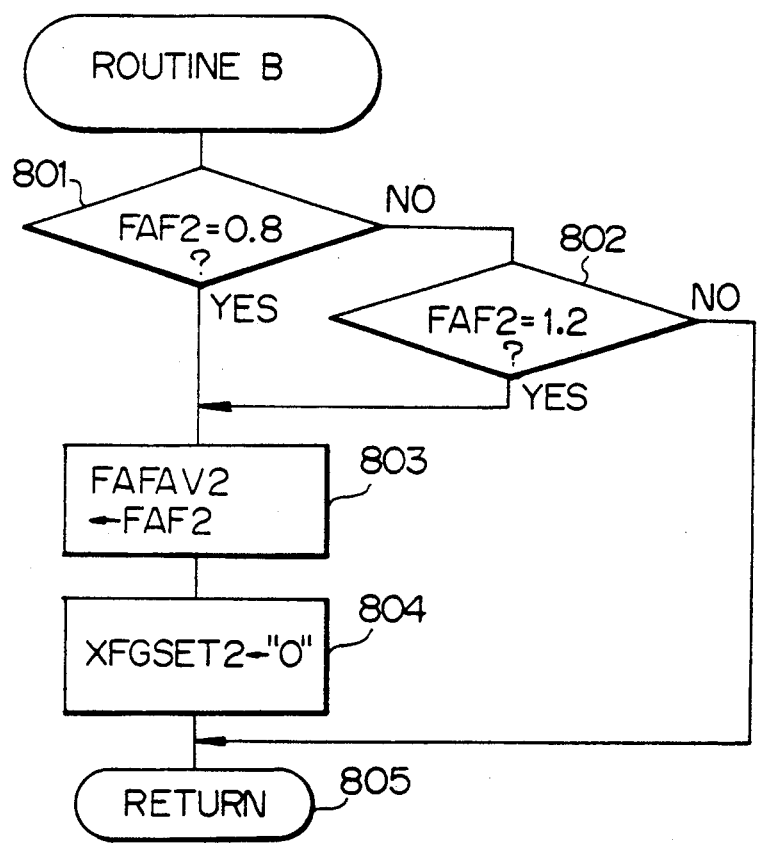
FIG. 6 is a detailed flow chart of routine B at step 612 in FIG. 4.

According to the routines shown in FIG. 5 and FIG. 6, the determination of whether or not the fuel supply system is in the abnormal state (from step 605 to step 610 in FIG. 4) is prohibited from the time at which the learning correction amount FG1 (FG2) was renewed to the time at which the average FAFAV1 (FAFAV2) is renewed. Accordingly, a misdetermination can be prevented even if FAFAV1+FG1 (FAFAV2+FG2) is an abnormal value when FAFAV1 (FAFAV2) is not renewed after FG1 (FG2) was renewed.

FIG. 5 is a detailed flow chart of routine A at step 613 in FIG. 4. At step 701, it is determined whether or not FAF1 is equal to a lower guard, for example, 0.8. When FAF1 is not equal to 0.8, the routine goes to step 702 and it is determined whether or not FAF1 is equal to an upper guard, for example, 1.2. When FAF1 is not equal to 1.2, i.e., FAF1>0.8 and FAF1<1.2, the routine goes to step 705, and thus this routine is ended. Conversely, when FAF1=0.8 or FAF1=1.2, the routine goes to step 703. At step 703, FAFAV1 is forcibly renewed and made FAF1. Then, at step 704, the learning flag XFGSET1 is reset, whereby the diagnosis (step 605 through step 610 in FIG. 4) can be carried out.

FIG. 6 is a detailed flow chart of routine B at step 612 in FIG. 4. At step 801, it is determined whether or not FAF2 is equal to a lower guard, for example, 0.8. When FAF2 is not equal to 0.8, the routine goes to step 802 and it is determined whether or not FAF2 is equal to an upper guard, for example, 1.2. When FAF2 is not equal to 1.2, i.e., FAF2>0.8 and FAF2<1.2, the routine goes to step 805, and thus this routine is ended. Conversely, when FAF2=0.8 or FAF2=1.2, the routine goes to step 803. At step 803, FAFAV2 is forcibly renewed and made to FAF2. Then, at step 804, the learning flag XFGSET2 is reset, whereby the diagnosis (step 605 through step 610 in FIG. 4) can be carried out.

As mentioned above, when FAF1 or FAF2 is stuck to the lower guard or the upper guard, and thus the air-fuel ratio is not inverted, FAFAV1 or FAFAV2 is not renewed. In this case, FAFAV1 or FAFAV2 is forcibly renewed by the routines in FIG. 5 and FIG. 6, whereby the diagnosis can be carried out.

Figure 7:
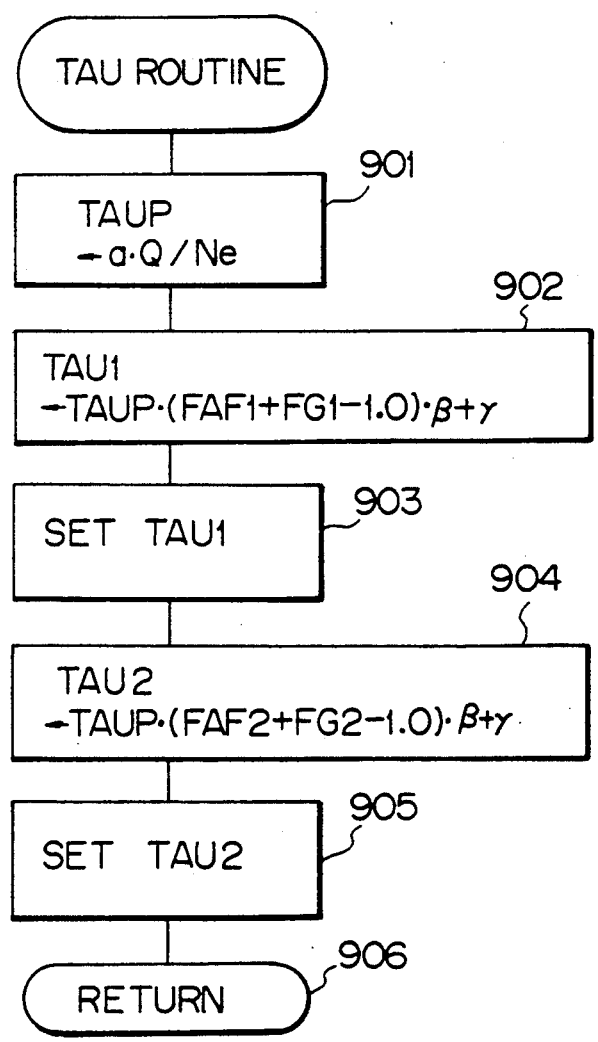
FIG. 7 is a flow chart for calculating a fuel injection amount TAU.

FIG. 7 is a routine for calculating a fuel injection amount TAU executed at each predetermined crank angle such as 360° CA. At step 901, a base fuel injection amount TAUP is calculated by using the intake air amount data Q and the engine speed data Ne stored in the RAM 105, i.e., $$TAUP = \alpha \cdot Q/Ne$$

where $\alpha$ is a constant.

At step 902, the fuel injection amount TAU1 for the right cylinder bank is calculated by $$TAU1 = TAUP \cdot (FAF1+FG1-1.0) \cdot \beta + \gamma$$

where $\beta$ and $\gamma$ are correction factors determined by other parameters. At step 903, the fuel injection amount TAU1 is set in the down counter 108A, and further, the flip-flop 109A is set to initiate the activation of the fuel injector 7A.

At step 904, the fuel injection amount TAU2 for the right cylinder bank is calculated by $$TAU2 = TAUP \cdot (FAF2 + FG2 - 1.0) \cdot \beta + \gamma$$

where $\beta$ and $\gamma$ are correction factors determined by other parameters. At step 905, the fuel injection amount TAU2 is set in the down counter 108B, and further, the flip-flop 109B is set to initiate the activation of the fuel injector 7B.

Referring to FIG. 8 through FIG. 12, a second embodiment of the present invention is described. In this embodiment, the determination of whether or not the fuel supply system is in the abnormal state is prohibited during a predetermined time from the time at which the learning correction amount FG1 or FG2 was renewed.

Figure 8B:
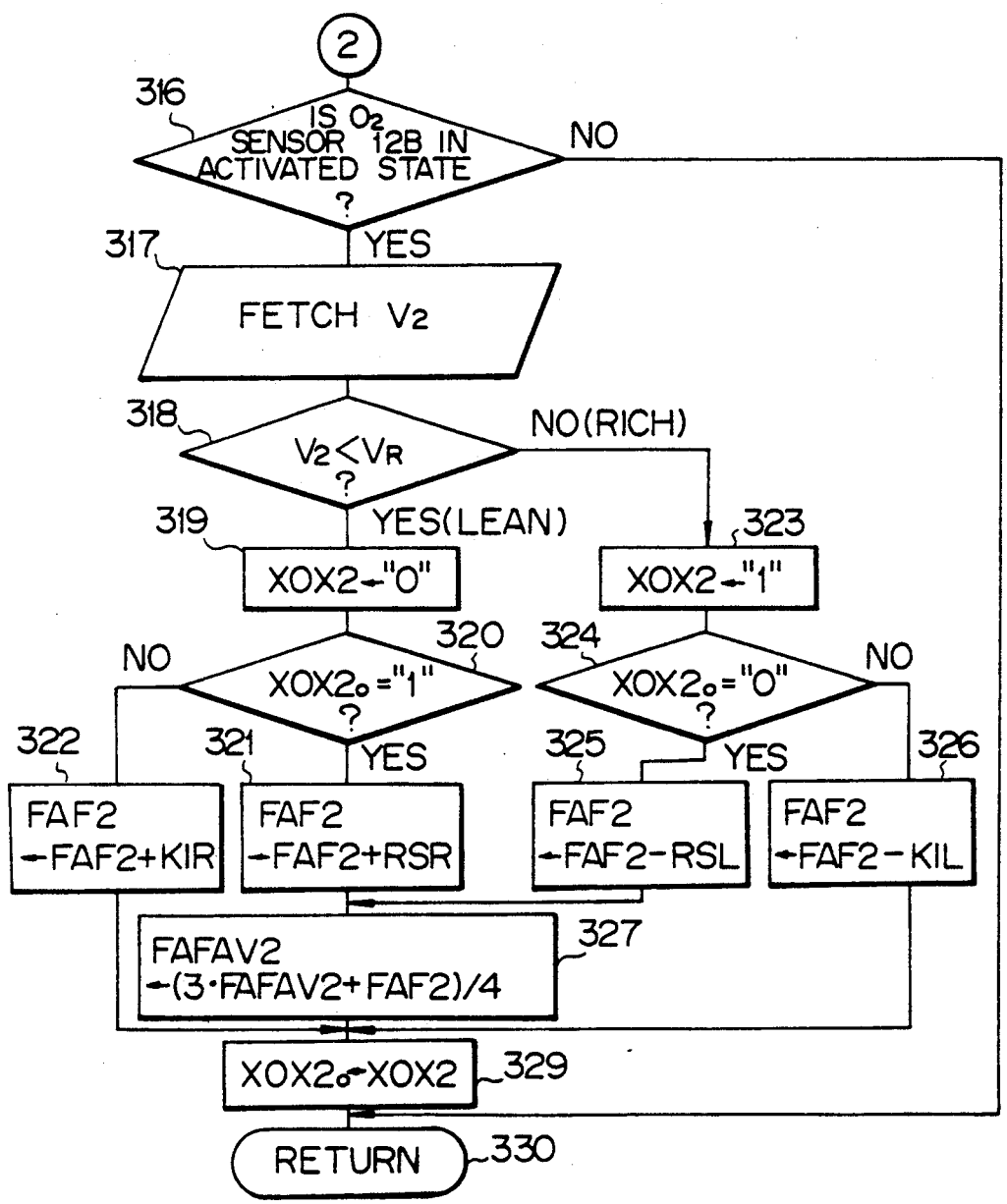

The routines in FIGS. 8A and 8B correspond to the routines in FIGS. 2A and 2B, except that step 314 and step 328 in FIGS. 2A and 2B are deleted.

Figure 9:
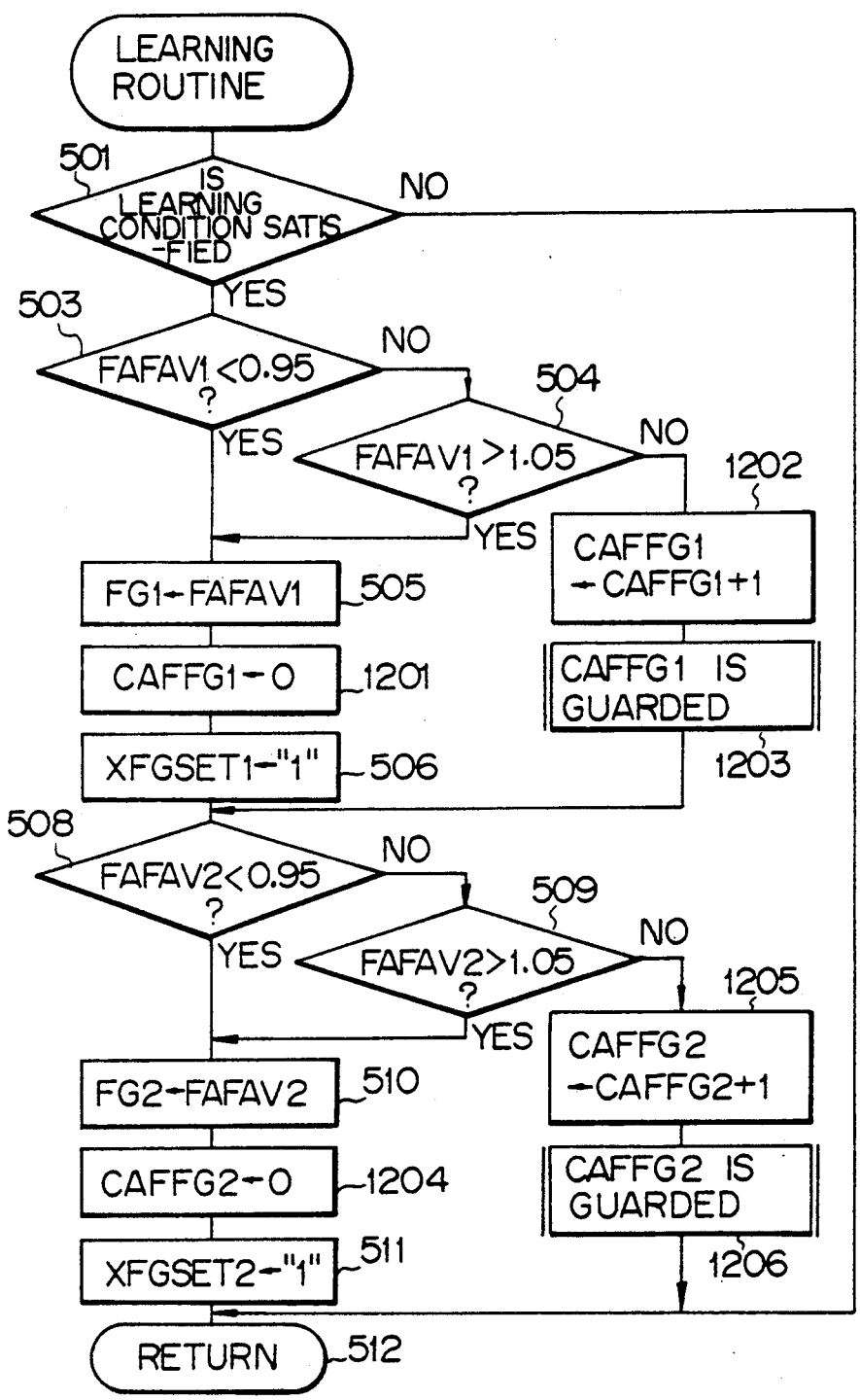
FIG. 9 is a flow chart of the second embodiment for calculating the learning correction amount FG.

The routine in FIG. 9 corresponds to the routine in FIG. 3, except that step 502 and step 507 in FIG. 3 are deleted and steps 1201 through 1206 are added.

Figure 10:
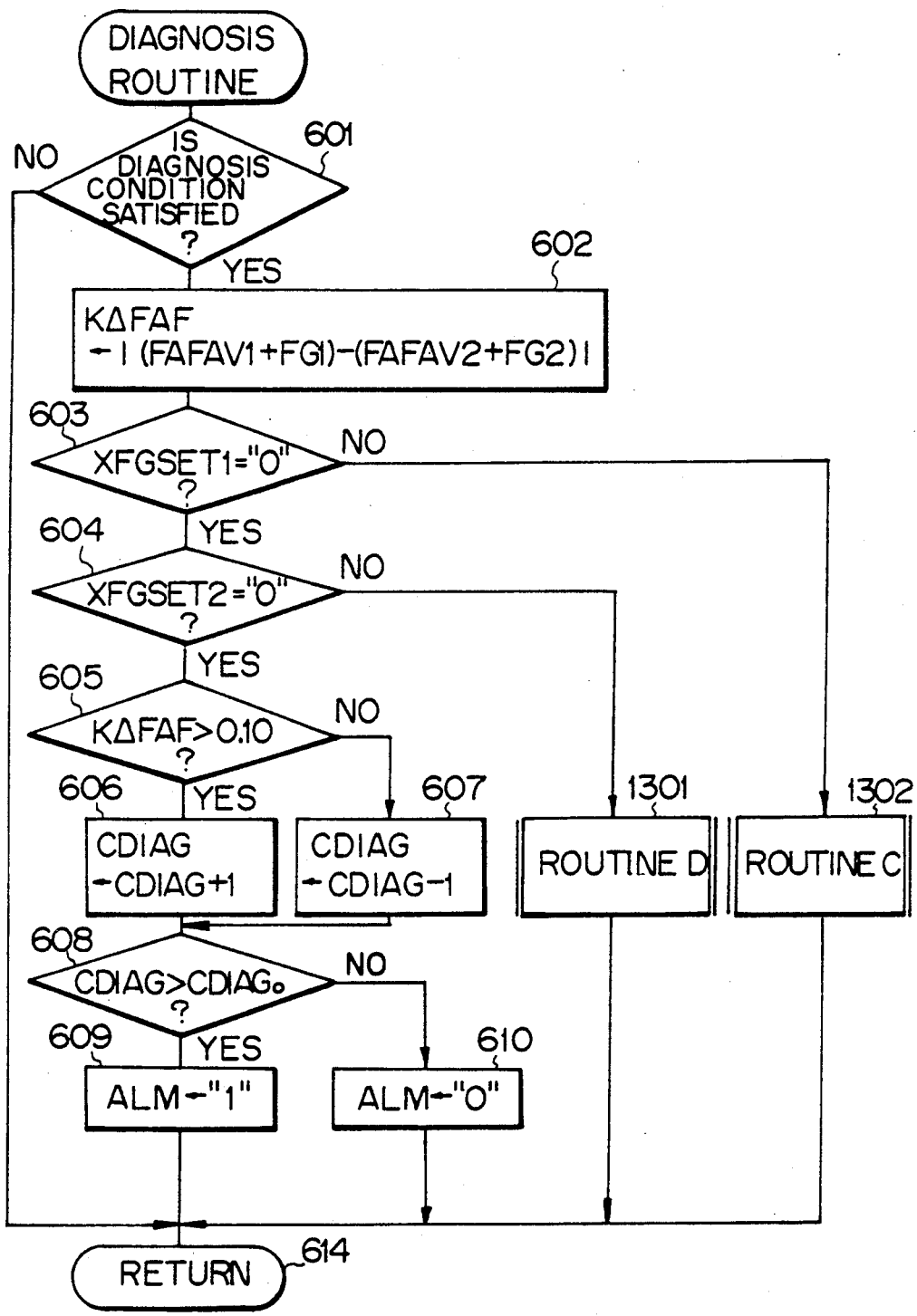
FIG. 10 is a flow chart of the second embodiment for detecting a malfunction of the fuel supply system.

Referring to FIG. 9, when the learning correction amount FG1 (FG2) has been renewed, the learning flag XFGSET1 (XFGSET2) is set to 1 at step 506 (step 511), whereby the determination of whether or not the fuel supply system is in the abnormal state is prohibited in the diagnosis routine (FIG. 10). A time counter CAFFG1 (CAFFG2) counts the time elapsed from the time at which the learning correction amount FG1 (FG2) has been renewed.

For example, when FG1 is renewed, the time counter CAFFG1 is cleared at step 1201 and then incremented by 1 at step 1202, and at step 1203, the time counter CAFFG1 is guarded by an upper guard. Similarly, when FG2 is renewed, the time counter CAFFG2 is cleared at step 1204 and then incremented by 1 at step 1205. At step 1206, the time counter CAFFG2 is guarded by an upper guard.

Figure 11:
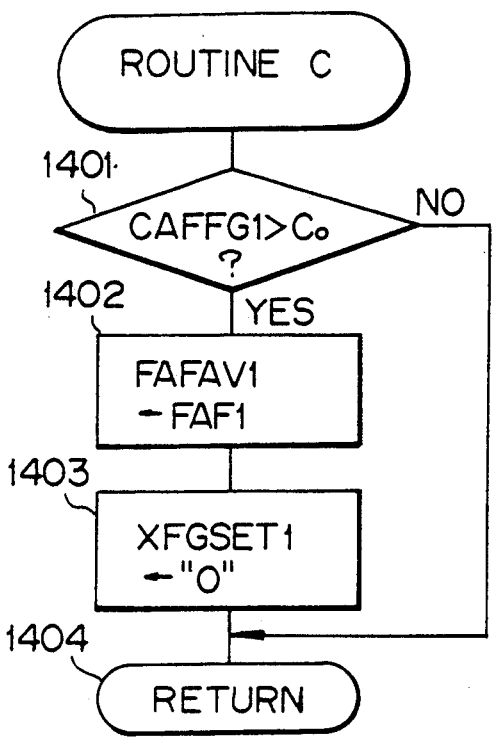
FIG. 11 is a detailed flow chart of routine C at step 1302 in FIG. 10.
Figure 12:
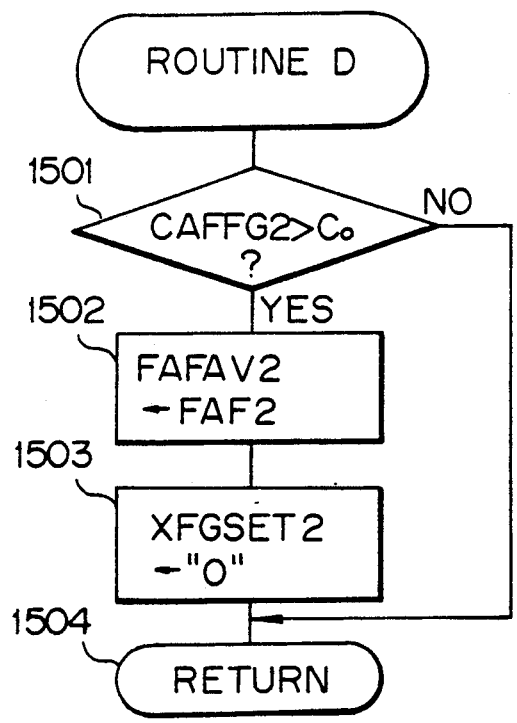
FIG. 12 is a detailed flow chart of routine D at step 1301 in FIG. 10.
Figure 13:
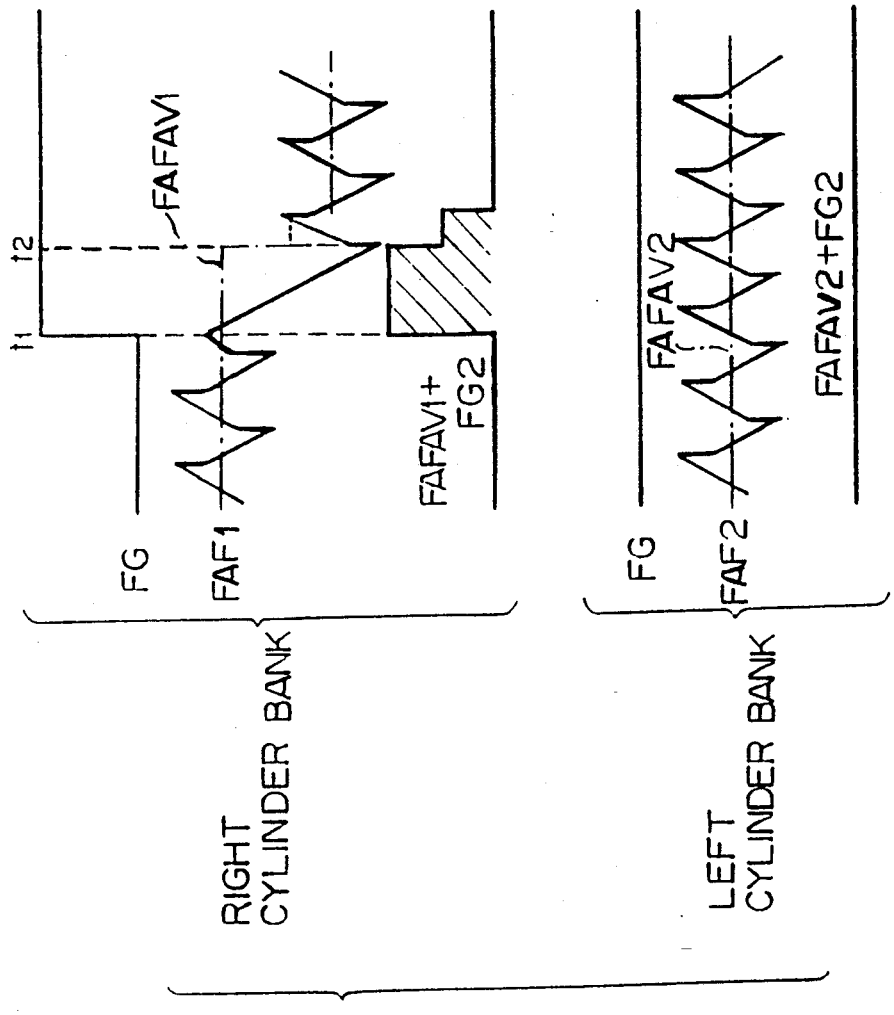
FIG. 13 is a time chart for explaining a problem of a related art.

XFGSET1, XFGSET2 are reset in routines of FIG. 11 and FIG. 12.

The routine of FIG. 10 corresponds to a routine of FIG. 4.

FIG. 11 is a detailed flow chart of a routine C of step 1302 in FIG. 10. At step 1401, it is determined whether or not CAFFG1 is larger than a predetermined value $C_0$, such as 10 sec. CAFFG1 indicates the time elapsed from the time at which FG1 has been renewed. When CAFFG1 $\leq C_0$, the routine goes to step 1404 and this routine is ended. Conversely, when CAFFG1 $> C_0$, the routine goes to step 1402 and FAFAV1 is made to FAF1. Then, at step 1403, XFGSET1 is reset to 0, and thus the determination of whether or not the fuel supply system is in the abnormal state can be carried out. At step 1404, this routine is ended.

FIG. 12 is a detailed flow chart of routine C of step 1301 in FIG. 10. At step 1501, it is determined whether or not CAFFG2 is larger than a predetermined value $C_0$, such as 10 sec. CAFFG2 indicates the time elapsed from the time at which FG2 has been renewed. When CAFFG2 $\leq C_0$, the routine goes to step 1504 and this routine is ended. Conversely, when CAFFG2 $> C_0$, the routine goes to step 1502 and FAFAV2 is made FAF2. Then, at step 1503, XFGSET2 is reset to 0, and thus the determination of whether or not the fuel supply system is in the abnormal state can be carried out. At step 1504, this routine is ended.

Note, in the above-mentioned embodiments, although an engine having two cylinder banks is described, the present invention can be applied to an engine having a single cylinder bank. In this case, the determination of whether or not the fuel supply system is in the abnormal state is carried out on the basis of K$\Delta$FAF calculated from the following equation.

$$K\Delta FAF = |(FAFAV + FG) - K_1|$$

where $K_1$ is a predetermined constant value.

Although the invention has been described with reference to specific embodiments chosen for purpose of illustration, it should be apparent that numerous modifications can be made thereto without departing from the basic concept and scope of the invention.

I claim:

1. An air-fuel ratio control device for an internal combustion engine having an exhaust passage and a fuel supply system, said device comprising:
    an air-fuel ratio detecting means arranged in the exhaust passage for detecting an air-fuel ratio;
    an air-fuel ratio feedback correction amount calculating means for calculating an air-fuel ratio feedback correction amount in accordance with an output of said air-fuel ratio detecting means to an increase in the air-fuel ratio when said output of said air-fuel ratio detecting means is on the rich side and to decrease the air-fuel ratio when said output of said air-fuel ratio detecting means is on the lean side;
    an average calculating means for calculating an average of said air-fuel ratio feedback correction amount every time the output of said air-fuel ratio detecting means is changed from rich to lean or from lean to rich;
    a learning means for calculating a learning correction amount on the basis of said average of said air-fuel ratio feedback correction amount so that said average is converged to a predetermined value;
    an air-fuel ratio control means for controlling the air-fuel ratio of the engine on the basis of said air-fuel ratio feedback correction amount and said learning correction amount to become the predetermined air-fuel ratio;
    an abnormal state determining means for determining that the fuel supply system is in an abnormal state by comparing a determining value calculated on the basis of said average and said learning correction amount with a predetermined reference value; and
    a prohibiting means for prohibiting a determination of said abnormal state determining means during a predetermined time from a time at which said learning correction amount was renewed.

2. An air-fuel ratio control device according to claim 1, wherein said air-fuel ratio detecting means is an oxygen concentration detection sensor.

3. An air-fuel ratio control device according to claim 1, wherein said air-fuel ratio feedback correction amount calculating means skips down said air-fuel ratio feedback correction amount by a lean skip amount when an output of said air-fuel ratio detecting means is switched from a lean side to a rich side, gradually decreases said air-fuel ratio feedback correction amount by a lean integration amount when the output of said air-fuel ratio detecting means is on the rich side, skips up said air-fuel ratio feedback correction amount by a rich skip amount when the output of said air-fuel ratio detecting means is switched from the rich side to the lean side, and gradually increases said air-fuel ratio feedback correction amount by a rich integration amount when the output of said air-fuel ratio detecting means is on the lean side.

4. An air-fuel ratio control device according to claim 1, wherein said average calculating means calculates a weighted average of said average calculated the last time and said air-fuel ratio feedback correction amount calculated this time.

5. An air-fuel ratio control device according to claim 1, wherein said average calculating means calculates an arithmetic mean of said air-fuel ratio feedback correction amount.

6. An air-fuel ratio control device according to claim 1, wherein said learning means renews said learning correction amount when said average is smaller than a predetermined first value or larger than a predetermined second value.

7. An air-fuel ratio control device according to claim 6, wherein said predetermined first value is equal to 0.95.

8. An air-fuel ratio control device according to claim 6, wherein said predetermined second value is equal to 1.05.

9. An air-fuel ratio control device according to claim 6, wherein said learning means makes said learning correction amount equal to said average when said average is smaller than said predetermined first value or larger than said predetermined second value.

10. An air-fuel ratio control device according to claim 1, wherein said air-fuel ratio control means determines the fuel injection amount as a product of a basic fuel injection amount and a sum of said air-fuel ratio feedback correction amount and said learning correction amount.

11. An air-fuel ratio control device according to claim 10, wherein said basic fuel injection amount is calculated on the basis of an amount of air fed into an engine cylinders and an engine speed.

12. An air-fuel ratio control device according to claim 1, wherein said determining value is calculated on the basis of a sum of said average and said learning correction amount.

13. An air-fuel ratio control device according to claim 1, wherein said determining value is calculated on the basis of a product of said average and said learning correction amount.

14. An air-fuel ratio control device according to claim 1, wherein the engine has a first cylinder bank and a second cylinder bank, a first air-fuel ratio detecting means being arranged in an exhaust passage of the first cylinder bank, a second air-fuel ratio detecting means being arranged in an exhaust passage of the second cylinder bank, said determining value being represented by a difference between a sum of the average of the first cylinder bank and the learning correction amount of the first cylinder bank, and a sum of the average of the second cylinder bank and the learning correction amount of the second cylinder bank.

15. An air-fuel ratio control device according to claim 1, wherein the engine has a first cylinder bank and a second cylinder bank, a first air-fuel ratio detecting means being arranged in an exhaust passage of the first cylinder bank, a second air-fuel ratio detecting means being arranged in an exhaust passage of the second cylinder bank, said determining value being represented by a difference between a product of the average of the first cylinder bank and the learning correction amount of the first cylinder bank, and a product of the average of the second cylinder bank and the learning correction amount of the second cylinder bank.

16. An air-fuel ratio control device according to claim 1, further comprising a malfunction determining means for determining whether or not a malfunction of the fuel supply system has occurred, on the basis of a determination by said abnormal state determining means.

17. An air-fuel ratio control device according to claim 16, wherein said malfunction determining means determines that a malfunction of the fuel supply system has occurred when said abnormal state determining means determines a predetermined number of times that the fuel supply system is in an abnormal state.

18. An air-fuel ratio control device according to claim 1, wherein said prohibiting means prohibits said determination of said abnormal state determining means from a time at which said learning correction amount was renewed to a time at which said average is renewed.

19. An air-fuel ratio control device according to claim 18, wherein said average is forcibly renewed when the output of said air-fuel ratio detecting means is not changed from rich to lean or from lean to rich for a predetermined time.

20. An air-fuel ratio control device according to claim 19, wherein said average is forcibly renewed when said air-fuel ratio feedback correction amount is equal to a lower guard or an upper guard.

21. An air-fuel ratio control device according to claim 1, wherein said prohibiting means comprises a timer for counting a time from a time at which said learning correction amount was renewed, and prohibits the determination by said abnormal state determining means until a predetermined time has elapsed from the time at which said learning correction amount was renewed.

22. An air-fuel ratio control device for an internal combustion engine having an exhaust passage and a fuel supply system, said device comprising:
an air-fuel ratio detecting means arranged in the exhaust passage for detecting an air-fuel ratio;
an air-fuel ratio feedback correction amount calculating means for calculating an air-fuel ratio feedback correction amount in accordance with an output of said air-fuel ratio detecting means to an increase in the air-fuel ratio when said output of said air-fuel ratio detecting means is on the rich side and to decrease the air-fuel ratio when said output of said air-fuel ratio detecting means is on the lean side;
a calculating means for calculating a first value in response to said air-fuel ratio feedback correction amount;
a learning means for calculating a learning correction amount on the basis of an average of said air-fuel ratio feedback correction amount so that said average is converged to a predetermined value;
an air-fuel ratio control means for controlling the air-fuel ratio of the engine on the basis of said air-fuel ratio feedback correction amount and said learning correction amount to become the predetermined air-fuel ratio;
an abnormal state determining means for determining that the fuel supply system is in an abnormal state by comparing a determining value calculated on the basis of said first value and said learning correction amount with a predetermined reference value; and a prohibiting means for prohibiting a determination of said abnormal state determining means during a predetermined time from a time at which said learning correction amount was renewed.

* * * * *